Nov. 20, 1962 R. CROSS 3,065,310

MAGAZINE FOR A TAPE RECORDER

Filed April 2, 1958

INVENTOR:
Radley Cross,
BY Paul & Paul
ATTORNEYS.

United States Patent Office 3,065,310

Patented Nov. 20, 1962

3,065,310

MAGAZINE FOR A TAPE RECORDER

Radley Cross, Cynwyd, Pa., assignor to Roy W. Keeler, Ralph W. Shaw, Jay C. Fonda, Radley Cross, Richard E. Messmer, and John F. Donohue, Philadelphia, Pa.

Filed Apr. 2, 1958, Ser. No. 725,856

5 Claims. (Cl. 179—100.2)

This invention relates to a magazine for a tape recorder and more particularly to a fully enclosed tape magazine for an automatic magnetic tape recorder.

In the art of magazine tape recorders need has arisen for recording and reproducing apparatus which will record or play for extremely long periods of time and will automatically change from one type of message to another without significant interruption. The need is particularly acute in the field of aviation where a recorder and player is required which will automatically, selectively play music, announcements, and/or other entertainment and information. In addition, the units for such purposes must be compact, able to withstand variations in temperature and pressure and changes in position incident to normal flight conditions. Inherent in any such recording unit where magnetic tape is used is the need for a self-contained tape magazine which will securely carry the tape and deliver it smoothly to playing or recording heads.

It is an object of this invention to provide a self-contained magazine for an automatic tape recorder which will smoothly and continuously deliver magnetic tape to playing or recording heads.

It is a further object of this invention to provide a magnetic tape recorder magazine which will present the tape to recording or playing heads in a substantially smooth condition.

It is a further object of this invention to provide a magnetic tape magazine which will deliver the magnetic tape to recording and playing heads substantially free of tension in the delivery.

Other objects and advantages will be apparent from the following description and drawings.

Figure 1:
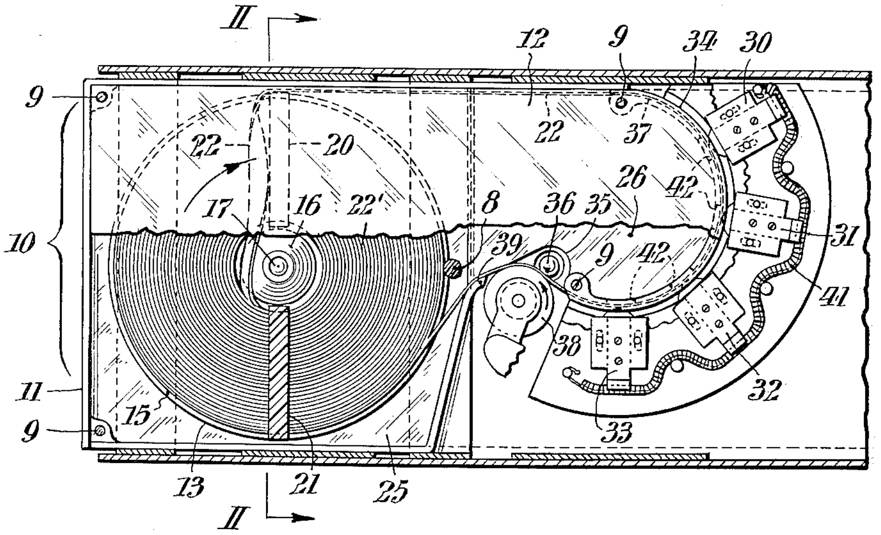
FIG. 1 is a plan view partially cut away of a tape magazine, embodying the principles of the invention, in place in a magnetic tape recorder.
Figure 2:
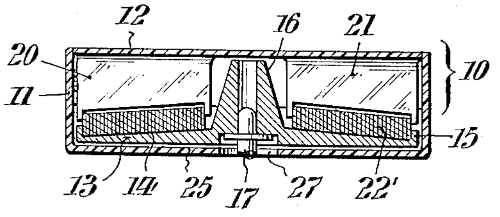
FIG. 2 is a sectional view along the line II—II of FIG. 1.
Figure 4:
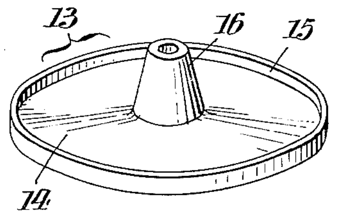
FIG. 4 is a perspective view of the turntable of the magazine shown in FIG. 1.

The magazine of this invention includes certain of the novel features of the co-pending application of Jay C. Fonda, Serial No. 570,180, filed March 7, 1956, now United States Patent No. 2,908,769, relating to a tape recorder and is an improvement upon that invention.

The magazine 10 has a tray 11 and a cover 12. When fully assembled, the cover 12 is rigidly affixed to the tray 11 by means of screws 9. A snap or other type of closure may be used. Turntable 13 is disposed within the tray 11 and is adapted to rotate in response to the drive of spindle 17. Spindle 17 is not a part of the magazine but is a part of the drive mechanism of the recorder, in which magazine 10 is used. Turntable 13 has a shallow conical surface 14 and a central cone 16. Rim 15 retains the tape in position on the turntable 13. Cover member 12 has depending guides 20 and 21, which retain the tape coil 22[1] in a substantially cylindrical shape on turntable 13. Guide pin 8 also depends from cover member 12 for the same purpose.

Tray portion 11 has two levels: a first level 25 in which turntable 13 is positioned and a second level 26 which places the tape 22 in playing position in the recorder. Lower level 25 is substantially square in shape and has an opening 27 in the bottom to accommodate spindle 17. Upper level 26 is raised to carry the tape 22 as it rises up out of the coil on turntable 13 and proceeds to playing position. In order to achieve the maximum use of space in accommodating a number of playing heads 30, 31, 32, and 33, the forward portion 34 of upper level 26 is curved. The playing heads may be any desired combination of recording, reproducing and erasing heads. They are urged toward the tape 22 by coil spring 41. The magazine 10 is further undercut at 35 to accommodate driving capstan 36 which is a part of the recorder. The curved shape of forward portion 34 presents a convex tape surface to the playing heads. This insures minimal contact between tape and playing heads which provides better playing and reproduction. It will be understood that it is not necessary to use a number of playing heads and that the benefit of the invention is also obtained when only one playing head is used.

Figure 3:
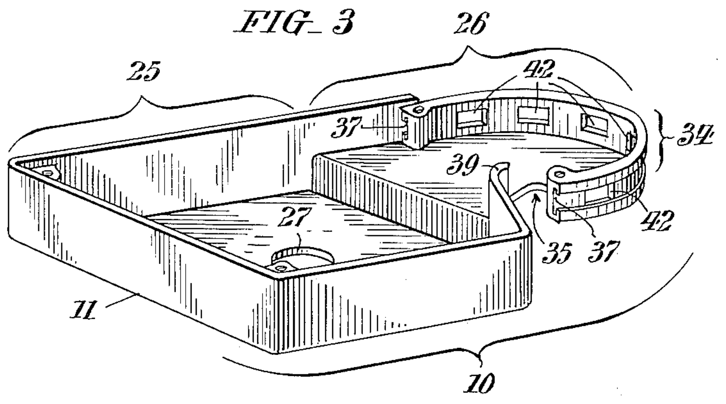
FIG. 3 is a perspective view of the magazine of FIG. 1 with the tape and turntable removed.

As shown in FIG. 1, the tape 22 proceeds out of the coil on turntable 13 along the edge of guide 20. At this point the loop is twisted. The twist provides what is known as a "Möbius loop" by virtue of which the tape reverses itself as it proceeds through the recording. Thus, when a given point on endless tape 22 passes the playing heads for the second time the reverse side of the tape faces the playing heads. This makes it possible to use both sides of tape 22 for recording and reproducing purposes. Tape 22 passes the outside of guide 20 and passes along the inner wall of bottom tray 11 to slot 37 (FIG. 3) formed in the forward portion 34 of upper level 26. Forward portion 34 is cut out, as shown, at the points indicated as 42 which would normally contact the playing heads 30, 31, 32, and 33. These cutouts 42 are provided so that the playing heads will be urged against the resilient tape without interference from the substantially rigid backing material 34. It has been found that a rigid backing material for the tape 22 at the playing heads causes distortion in the signals transmitted to or from the playing heads. The tape passes the playing heads and continues between capstan 36 and idler roller 38 and thence past intake guard 39 to the coil on turntable 13.

In operation, tape 22 is moved both by turntable 13, driven by spindle 17, and capstan 36. The buildup of tension in the tape 22 is thus prevented. By this means a smoother flow of tape 22 past recording and playing heads 30, 31, 32, and 33 is maintained.

The two level construction of bottom tray 11 of magazine 10 is specifically adapted to the normal delivery of tape 22 from and to turntable 13. Tape 22 is delivered from the center of the coil 22[1] on turntable 13 and as it issues from the coil it rises vertically out of the plan of rotation. This vertical movement is necessary and is enhanced by the construction of turntable 13, shallow conical surface 14 and conical surfaces 16 assist the positive delivery of the tape from the center of the coil. It is therefore necessary in order to prevent interference with the normal flow of tape 22 to place the playing heads 30, 31, 32 and 33 vertically above the plan of the coil 22[1] on turntable 13.

The tape magazine made according to this invention and the particular magazine illustrated in the drawings provide an endless coil of magnetic tape which can be played on both sides without interruption and which can be used with a number of playing heads in a compact container. The playing heads 30, 31, 32, and 33 may be arranged to perform any desired function of which they are capable. As shown, they are positioned at different vertical levels along the width of tape 22. For example, each of the four playing heads may be set to play upon a different longitudinal track on tape 22. By virtue of the "Möbius loop," the number of available tracks is increased to eight. By selecting the playing heads to be used, the particular track to be played may be selected. It will be apparent that a great many possible variations may be made in this flexible arrangement of magnetic tape and recording heads.

It will be apparent from the foregoing description that the term "playing heads" has been used throughout to mean recording, erasing and reproducing heads with similar use of the term "playing," and it is thus that these terms are to be understood.

While in accordance with the provisions of the statutes, I have illustrated and described the best form of embodiment of my invention now known to me it will be apparent to those skilled in the art that changes may be made in the form of the apparatus described without departing from the spirit and scope of the invention, as set forth in the appended claims, and that in some cases certain features of my invention may be used to advantage without a corresponding use of other features.

Having thus described my invention, I claim:

1. A magazine for a tape recorder having playing heads, a spindle for driving said tape magazine and a capstan for moving a magnetic tape, comprising a bottom tray having a lower level substantially square in shape and provided with an opening in the bottom thereof for accommodating said drive spindle, said tray having an upper level with a curved, forwardly projecting tape-carrying member, said tape-carrying member being slotted to accommodate said magnetic tape and being cut out at spaced apart points to coincide with the points of contact of the playing heads of said tape recorder with said magnetic tape carried in said tape carrying member, said tape-carrying member being undercut to accommodate said drive capstan for moving said magnetic tape therethrough, a guide member on said bottom tray for guiding said magnetic tape from said tape-carrying member past said tape-driving capstan into said bottom tray, a cover member substantially conforming in shape to said bottom tray having a pair of aligned depending guide members and a guide pin for maintaining a coil of magnetic tape in position in said bottom tray and a turntable in the lower level of said bottom tray centered over the opening therein to accommodate a drive spindle, said turntable having a disc portion sloping upward toward the center thereof, a conical center portion and a raised rim about the circumference of said disc portion.

2. A magazine for a tape recorder comprising a housing, rotatable means in said housing for storing a magnetic tape and for continuously moving said tape out of said housing, a projecting tape-carrying member rigidly connected to said housing for receiving said tape as it is delivered from said housing, said projecting member being undercut to form a slot for carrying said tape, portions of said projecting member being cut out at points corresponding to the positions of playing heads in said tape recorder, said projecting member being disposed in a vertically offset plane with respect to said housing at the level at which said tape is delivered from said housing.

3. In a magazine for a tape recorder a turntable comprising a disc portion sloping upward toward the center thereof, a conical center portion fixed at the center of said disc and having a substantially greater slope than said disc portion and retaining means for retaining a coil of tape in position on said disc portion comprising a raised rim about the circumference of said disc portion.

4. In a tape recorder having a plurality of magnetically sensitive playing heads and driving means, a magnetic tape-storing housing, an opening in the bottom of said housing to accommodate a spindle driven by said driving means, a turntable in said housing adapted to be mounted on said spindle, an endless coil of magnetic tape disposed on said turntable and extending out of said housing, said tape forming a mobius loop, said tape adapted to be driven by said capstan and means integrally and rigidly connected with said housing for placing said tape in operative contact with said playing heads, said means being disposed in a plane parallel to the plane of said turntable and substantially offset with respect thereto.

5. In a tape recorder, a plurality of magnetically sensitive playing means disposed along a curved path, a curved substantially rigid tape carrying member substantially conforming in shape to said curved path disposed adjacent said playing means for continuously delivering a magnetic tape to said playing means, yieldable means for urging said playing means into operative contact with said tape, said tape carrying member having a slot carrying the magnetic tape and having a portion thereof adjacent said tape and opposite each of said playing means cut out to render said tape substantially yieldable at its point of contact with each of said playing means.

References Cited in the file of this patent

UNITED STATES PATENTS

| | | |
|---|---|---|
| 2,363,627 | Van der Schalie | Nov. 28, 1944 |
| 2,651,964 | Doyle | Sept. 15, 1953 |
| 2,699,332 | MacKenzie | Jan. 11, 1955 |
| 2,778,636 | Eash | Jan. 22, 1957 |
| 2,908,769 | Fonda | Oct. 13, 1959 |
| 2,921,787 | Cousino | Jan. 16, 1960 |
| 2,982,489 | Horres | May 2, 1961 |

FOREIGN PATENTS

| | | |
|---|---|---|
| 532,989 | Italy | Sept. 13, 1955 |